June 17, 1958 A. C. DEMURJIAN Re. 24,488

STANDOFF TERMINALS

Original Filed Sept. 4, 1951

INVENTOR.
Ashod Charles Demurjian
BY
Nathaniel Trask
ATTORNEY

United States Patent Office

Re. 24,488
Reissued June 17, 1958

24,488

STANDOFF TERMINALS

Ashod Charles Demurjian, Cranston, R. I.

Original No. 2,726,280, dated December 6, 1955, Serial No. 244,967, September 4, 1951. Application for reissue November 22, 1957, Serial No. 700,248

6 Claims. (Cl. 174—166)

Matter enclosed in heavy brackets [ ] appears in the original patent but forms no part of this reissue specification; matter printed in italics indicates the additions made by reissue.

The present invention relates to electronic equipment and has particular reference to a novel construction for insulated standoff terminals.

The principal object of the invention is to provide a construction for a standoff terminal for simple and effective attachment to electronic equipment.

Another object of the invention is to provide a construction facilitating removal of a standoff terminal from electronic equipment.

A further object of the invention is to provide a construction whereby the fastening insert of a standoff terminal can be tightened without danger of loosening or damaging the insulation.

With the above and other objects and advantageous features in view, the invention consists of a novel arrangement of parts more fully disclosed in the detailed description following, in conjunction with the accompanying drawings, and more specifically defined in the claims appended thereto.

Figure 1:
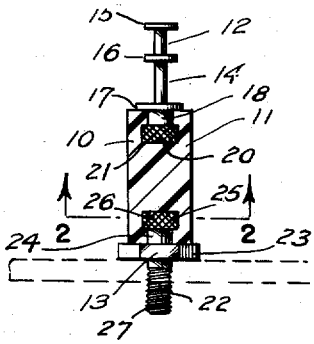
Fig. 1 is a vertical cross sectional view through an illustrative insulated standoff terminal embodying the invention.

It has been found desirable to provide an insulated standoff terminal with a fastening insert which is molded into a body of insulating material and which is constructed so that it can be readily grasped for easy mounting and dismounting on electronic equipment. To this end, I form the fastening insert with an integral wrench engageable element which completely eliminates mounting and removing strain from the insulating body.

Referring to the drawings, the standoff terminal 10 includes an insulating body 11, preferably of cylindrical form, having an upper terminal connector 12 and a lower fastening insert 13. The insulating body 11 may be of any suitable dielectric material, and is preferably of molded plastic.

The illustrated terminal connector 12 is of the multiple contact type, with a vertical shank 14 having upper spaced disks 15, 16 and a lower base plate 17, the base plate having a reduced central hub 18 terminating in an enlarged anchor disk 20 having lock knurls 21, the insulating body being molded to extend between the base plate and the anchor disk and around the central hub. The lock knurls may be of any desired type, diamond cuts being preferred, whereby the terminal connector is firmly locked within the upper part of the insulating body.

Figure 2:
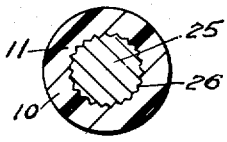
Fig. 2 is a transverse sectional view on the line 2—2 of Fig. 1.
Figure 3:
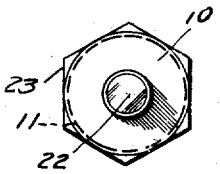
Fig. 3 is a bottom view of the insulated standoff terminal of Fig. 1.
Figure 4:
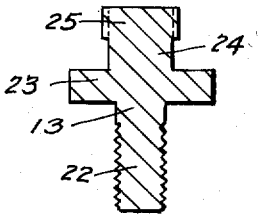
Fig. 4 is an enlarged vertical cross sectional view of the preferred form of my novel fastening insert.
Figure 5:
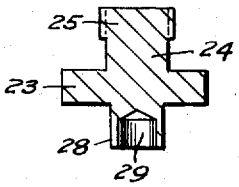
Figs. 5 and 6 are cross sectional views of modified forms of fastening inserts.
Figure 6:
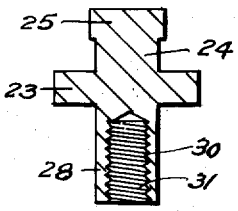

The lower fastening insert 13 consists of a vertical shank 22 having a plate 23, preferably formed into a hexagonal periphery to serve as a nut for wrench grasping, see Fig. 3, the plate 23 has a central hub 24 terminating in an enlarged anchor disk 25 provided with lock knurls 26, the insulating body being molded to extend between the plate 23 and the anchor disk 25. The lock knurls may be of any desired type, diamond cuts being preferred, whereby the fastening insert is firmly locked with the lower part of the insulating body as shown in Fig. 2. The lower part of the vertical shank 22 is preferably threaded to provide a screw 27 as shown in Figs. 1 and 4, to seat into a correspondingly threaded recess, but it may be formed into a tubular hollow extension member 28 having a tapped hole 29 as shown in Fig. 5 or having a tapped and reamed hole 30 with internal threads 31, as shown in Fig. 6.

Figure 7:
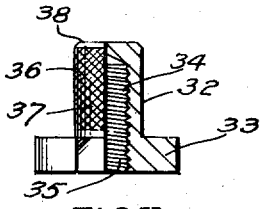
Fig. 7 is a view partly in cross section of another form of a fastening insert.

The fastening insert for some electronic equipment may be formed as shown in Fig. 7, with a central hub 32 having a plate 33 with a hexagonal periphery. The insert has a tapped and reamed bore 34 with internal threads 35 which extends through the plate and into the hub. The outside 36 of the hub has lock knurls 37 and a chamfered top 38.

The position and construction of the hexagonal peripheral plate makes possible simple and effective mounting and dismounting of the standoff terminal on the bases of electronic devices. In my assembly the plate is slightly greater in width across the flats than in the diameter of the insulating body. A wrench can therefore be placed over the terminal connector and the insulating body to engage the periphery of the plate and rotate the standoff terminal within its recess in the electronic devices. This has the advantage of relieving the insulating body from strain at all times, thereby preventing cracking and resultant electrical leakage. The easy accessibility of the hexagonal plate to a socket wrench without engaging the insulating body thus has the advantage of preventing breakage and damage to the insulating body. This not only makes possible quick assemblage of the electronic parts, but also eliminates rejects and lowers the cost of production. *In the construction shown in Fig. 5, the terminal is mounted by spreading or swaging the tubular hollow portion 28 with a suitable tool. When this is done, a hollow tool may be slipped over the body 11 to engage the upper surface of the plate 23 extending beyond the body 11 to hold the terminal in place and act as an anvil for the swaging tool.*

The terminal connector is preferably of hot tin dip or silver plate, and the fastening insert of cadmium plate. However, any other materials suitable for the purpose may be used.

While I have described specific constructional embodiments of the invention, it is obvious that changes in the size, shape and arrangement of the parts and of their materials may be made to suit the requirements for different types of electronic equipment without departing from the spirit and the scope of the invention as defined in the appended claims.

I claim:

1. A standoff terminal for electronic equipment, having an insulating body, a terminal connector secured to one end thereof, and a fastening insert at the other end thereof in axial alignment with the terminal connector, said fastening insert having a base plate [with a hexagonal periphery], a lock element with a central hub terminating in an enlarged anchor disk, said lock element being locked within the insulating body with the insulating body extending between the plate and the anchor disk, and a securing element depending from said plate and adapted to lock seat in the base of an electronic device, the [distance between opposite hexagonal sides] *diameter* of the base plate being [slightly] greater than the width of the body, 2. A standoff terminal for electronic equipment, having an insulating body, a terminal connector secured to one end thereof, said terminal connector including a base plate and a central hub terminating in an enlarged anchor disk, said enlarged anchor disk being locked within the insulating body with the insulating body extending between the plate and the anchor disk, and a fastening insert at the other end thereof in axial alignment with the terminal connector, said fastening insert having a base plate [with a hexagonal periphery], a lock element with a central hub terminating in an enlarged anchor disk, said lock element being locked within the insulating body with the insulating body extending between the plate and the anchor disk, and a securing element depending from said plate and adapted to lock seat in the base of an electronic device, the [distance between opposite hexagonal sides] *diameter* of the base plate being [slightly] greater than the width of the body.

3. A standoff terminal for electronic equipment, having an insulating body, a terminal connector secured to one end thereof, said terminal connector including a base plate and a central hub terminating in an enlarged anchor disk, said enlarged anchor disk being locked within the insulating body with the insulating body extending between the plate and the anchor disk, and a fastening insert at the other end thereof in axial alignment with the terminal connector, said fastening insert having a base plate [with a hexagonal periphery], a lock element with a central hub terminating in an enlarged anchor disk, said lock element being locked within the insulating body with the insulating body extending between the plate and the anchor disk, and a securing element depending from said plate and adapted to lock seat in the base of an electronic device, the [distance between opposite hexagonal sides] *diameter* of the base plate being [slightly] greater than the width of the body, said terminal connector and fastening insert anchor disks being in spaced relationship to each other.

4. A standoff terminal for electronic equipment, having an insulating body, a terminal connector secured to one end thereof, and a fastening insert at the other end thereof in axial alignment with the terminal connector, said fastening insert having a base plate [with a hexagonal periphery], a lock element with a central hub terminating in an enlarged anchor disk, said lock element being locked within the insulating body with the insulating body extending between the plate and the anchor disk, and a securing element depending from said plate and adapted to lock seat in the base of an electronic device, said securing element including a vertical shank having a tapped hole, the [distance between opposite hexagonal sides] *diameter* of the base plate being [slightly] greater than the width of the body.

5. A standoff terminal for electronic equipment, having an insulating body, a terminal connector secured to one end thereof, and a fastening insert at the other end thereof in axial alignment with the terminal connector, said fastening insert having a base plate with a hexagonal periphery, a lock element with a central hub terminating in an enlarged anchor disk, said lock element being locked within the insulating body with the insulating body extending between the plate and the anchor disk, and a securing element depending from said plate and adapted to lock seat in the base of an electronic device, said securing element including a vertical shank having a tapped and reamed hole with internal threads, the distance between opposite hexagonal sides of the base plate being slightly greater than the width of the body.

6. A standoff terminal for electronic equipment, having an insulating body, a terminal connector secured to one end thereof, said terminal connector including a base plate and a central hub terminating in an enlarged anchor disk, said enlarged anchor disk being locked within the insulating body with the insulating body extending between the plate and the anchor disk, and a fastening insert at the other end thereof in axial alignment with the terminal connector, said fastening insert having a base plate with a hexagonal periphery and an upstanding lock element locked within the insulating body, said fastening insert having a bore with internal threads and extending through the plate and into the lock element, said fastening device being adapted to lock seat in the base of an electronic device, the distance between the hexagonal sides being slightly greater than the width of the body.

References Cited in the file of this patent or the original patent

UNITED STATES PATENTS

| | | |
|---|---|---|
| 710,216 | Schmidt | Sept. 30, 1902 |
| 923,598 | Steinberger | June 1, 1909 |
| 955,185 | McCallum | Apr. 19, 1910 |
| 1,000,535 | McCarthy | Aug. 15, 1911 |
| 1,142,394 | Bolus | June 8, 1915 |
| 2,295,872 | Stohl | Sept. 15, 1942 |
| 2,443,435 | Taylor | June 15, 1948 |
| 2,462,489 | Hallett | Feb. 22, 1949 |

FOREIGN PATENTS

| | | |
|---|---|---|
| 530,809 | France | Oct. 11, 1921 |